(12) United States Patent
Foster

(10) Patent No.: US 7,508,100 B2
(45) Date of Patent: Mar. 24, 2009

(54) ELECTRIC MOTOR/GENERATOR AND METHOD OF COOLING AN ELECTROMECHANICAL TRANSMISSION

(75) Inventor: Michael D. Foster, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 723 days.

(21) Appl. No.: 11/060,068

(22) Filed: Feb. 17, 2005

(65) Prior Publication Data

US 2005/0206251 A1   Sep. 22, 2005

Related U.S. Application Data

(60) Provisional application No. 60/555,141, filed on Mar. 22, 2004.

(51) Int. Cl.
*H02K 9/19* (2006.01)
(52) U.S. Cl. .......................... 310/54; 310/61; 180/65.6; 475/5
(58) Field of Classification Search .......... 310/52, 310/54, 58; 475/5, 149, 159; 180/65.1, 65.2, 180/65.3, 65.6
See application file for complete search history.

(56) References Cited

U.S. PATENT DOCUMENTS

| | | | | |
|---|---|---|---|---|
| 3,770,074 | A * | 11/1973 | Sherman | 180/65.6 |
| 4,418,777 | A | 12/1983 | Stockton | 180/65 |
| 6,579,202 | B2 | 6/2003 | El-Antably et al. | 475/159 |
| 6,743,135 | B2 * | 6/2004 | Klemen et al. | 475/5 |
| 6,862,887 | B2 * | 3/2005 | Noreikat et al. | 60/716 |
| 7,002,267 | B2 * | 2/2006 | Raszkowski et al. | 310/54 |
| 7,195,575 | B2 * | 3/2007 | Kempf | 475/5 |
| 2002/0077209 | A1 * | 6/2002 | El-Antably et al. | 475/159 |
| 2003/0064846 | A1 * | 4/2003 | Klemen et al. | 475/5 |
| 2004/0036367 | A1 | 2/2004 | Denton et al. | 310/61 |
| 2005/0206251 | A1 * | 9/2005 | Foster | 310/59 |

FOREIGN PATENT DOCUMENTS

| | | | |
|---|---|---|---|
| JP | 02017846 | * | 1/1990 |
| JP | 2003009467 | * | 1/2003 |
| JP | 2003169448 | * | 6/2003 |
| JP | 2003324901 | * | 11/2003 |

OTHER PUBLICATIONS

Translation of JP 2003009467, "Motor Cooling Mechanism", Tadaaki Iiyama, Jan. 10, 2003.*
Translation of JP 2003-234901 "motor", Hirohito Matsu et al., Nov. 14, 2003.*
Translation of JP 2003-169448, "Driving Gear for Hybrid Vehicle", Junko Hayashi, Jun. 13, 2003.*

* cited by examiner

*Primary Examiner*—Karl I Tamai

(57) ABSTRACT

An electromechanical transmission includes a rotor supported by a rotor hub that has at least one passage formed therein for providing cooling fluid flow to the rotor. Preferably, cooling fluid is provided to the passage through an orifice to control flow rate. An inner diameter of the rotor is supported by the rotor hub and fluid is pooled by the rotor hub opposite the rotor inner diameter for cooling thereof. Preferably, fluid is thrown by centrifugal force from the rotor hub onto rotor ends and then onto an inner diameter side of stator windings of a stator surrounding the rotor. A method of cooling an electromechanical transmission is also provided.

9 Claims, 2 Drawing Sheets

ELECTRIC MOTOR/GENERATOR AND METHOD OF COOLING AN ELECTROMECHANICAL TRANSMISSION

CROSS REFERENCE TO RELATED APPLICATONS

This application claims the benefit of U.S. Provisional Application 60/555,141, filed Mar. 22, 2004, which is hereby incorporated by reference in its entirety.

TECHNICAL FIELD

The invention relates to cooling of motor/generators in a hybrid electromechanical transmission.

BACKGROUND OF THE INVENTION

Hybrid electric vehicles offer potential improvements in fuel economy and further reductions in emissions. A hybrid electric vehicle incorporates a traditional internal combustion engine combined with an electromechanical transmission having one or more electric motor/generators arranged in series or parallel and gearing arrangements such as planetary gear sets. The electric motor/generators assist in propulsion or energy absorption (storage) depending on the mode of operation. As with any energy conversion device, the motor/generators are less than 100 percent efficient, and reject some energy as heat. Efficient removal of this waste heat is required in order to achieve the objective of a fuel-efficient vehicle.

SUMMARY OF THE INVENTION

An efficient motor cooling system that is integrated with the cooling system for the planetary gearing and clutches is provided. Within the scope of the invention, an electric motor/generator that has a generally annular stator surrounding a generally annular rotor includes a rotor hub that supports the rotor. The rotor hub has at least one passage formed therein to permit cooling fluid flow through the rotor hub to cool the rotor. Preferably, a generally radial passage extends from an inner end to an outer end through the rotor hub and is sealed at the outer end by the rotor. A generally axial passage intersects with the radial passage and fluid in the radial passage may exit the rotor hub via centrifugal force and/or pumped fluid pressure through the axial passage.

The rotor hub may be formed with an annulus at an inner end of the radial passage to collect cooling fluid for flow through the passage. Rotating transmission elements, such as coaxial shafts may form a cavity therebetween which contains pressurized fluid that is metered through an orifice to the inner end annulus. Other lubrication-requiring elements, such as bearings, may also be provided with cooling fluid from the cavity.

Preferably, the rotor hub has a radial support portion and a shoulder portion extending generally axially therefrom. The shoulder portion has ends that extend radially inward to form shoulder portion annuli between the ends and the radial portion. Fluid exiting from the passages in the rotor hub is caught by the ends and pools into the shoulder portion annuli to rest against the rotor hub opposite the inner diameter of the rotor, which is a crucial area for cooling. Centrifugal force causes the pooled fluid to spill past the shoulder portion ends into a crevice formed between a motor housing and the rotor hub. The fluid flows through the crevice, onto rotor ends and is thrown off the rotor ends onto an inner diameter of the stator windings. Direct cooling of the rotor ends is an efficient way to remove a significant amount of heat from the rotor. As the inner diameter side of the stator windings is difficult to cool, it is typically cooled by fluid flowing inward from the outer diameter of the windings. By directly cooling the inner windings, the invention offers an efficiency savings over attempting to force fluid inward, through dense outer windings.

Accordingly, a method of cooling an electromechanical transmission includes supporting a rotor on a rotor hub and providing at least one passage in the rotor hub (e.g., by machining) to allow cooling fluid to be directed therethrough to cool the rotor. A cavity may be formed in fluid communication with the passage and fluid flow restricted from the cavity to the passage (e.g., via an orifice) in accordance with the method. The method may include catching fluid provided from the orifice in an annulus formed by the rotor hub at the inner end of the passage. Preferably, a lubrication-requiring component is provided and fluid from the cavity is also used to cool that component such that the motor cooling is combined with other cooling systems in the transmission. Pooling fluid in the shoulder portion annulus described above, throwing cooling fluid from that annulus through the crevice between the motor housing and the rotor hub onto rotor ends and then onto the inner diameter of the stator windings may also be included in the method.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
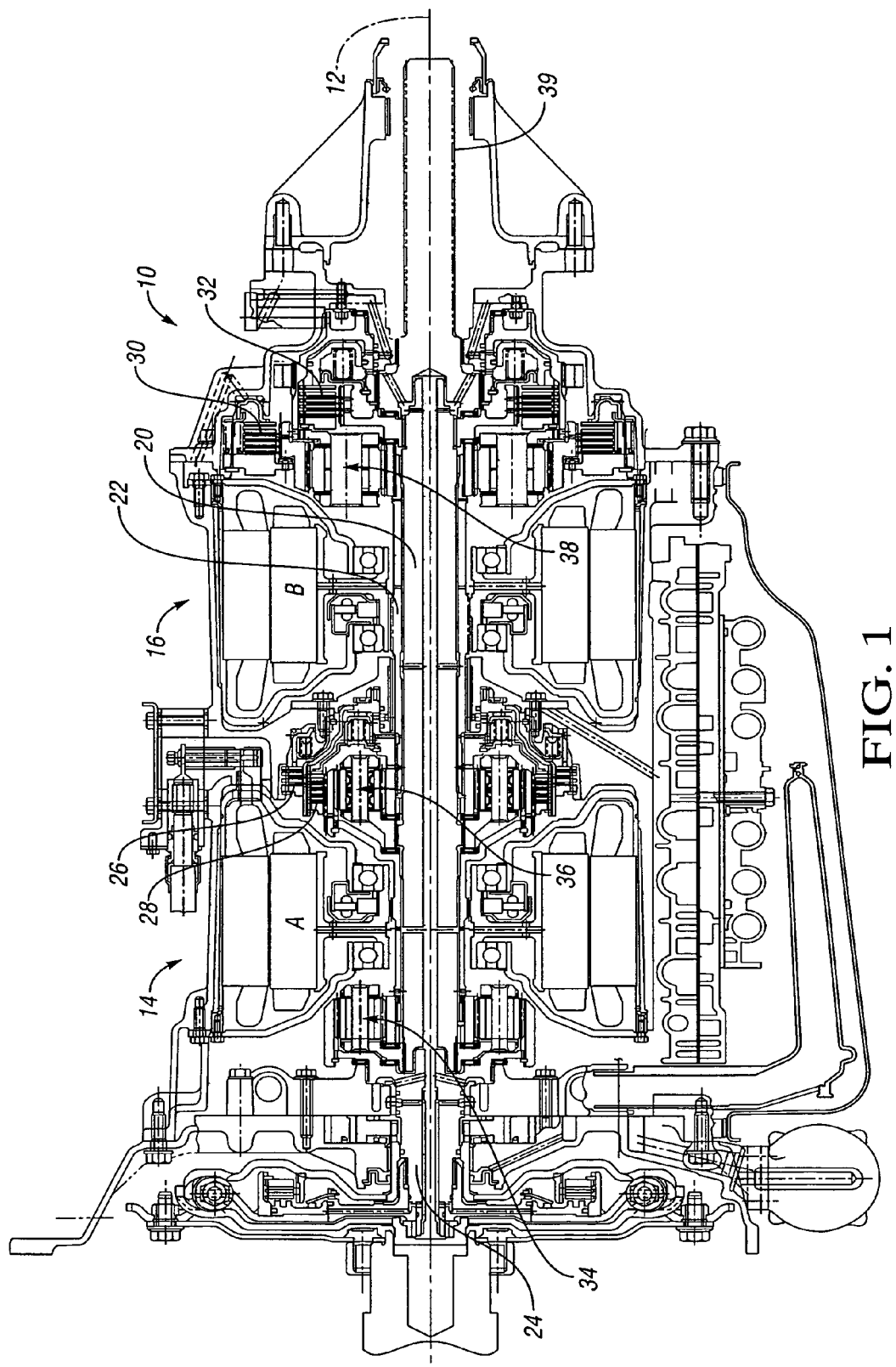
FIG. 1 is a schematic cross-sectional illustration of an electromechanical transmission having a motor/generator with a rotor supported by a rotor hub.

Referring to the drawings, wherein like reference numbers refer to like components, FIG. 1 shows a hybrid electromechanical transmission 10 with a center axis 12. First and second electric motor/generator modules 14, 16, labeled A and B respectively in FIG. 1, are disposed about the center axis 12 within the transmission 10. Each of the motor/generator modules includes a rotor, a rotor hub supporting the rotor, a stator, and a motor housing supporting the stator, as shown and described with respect to FIG. 2, below. A main shaft 20 is longitudinally disposed, rotatable about the center axis 12. A plurality of inner shafts, such as inner shaft 22, are concentrically disposed about the main shaft 20, and are likewise rotatable about the center axis. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member 39.

Figure 2:
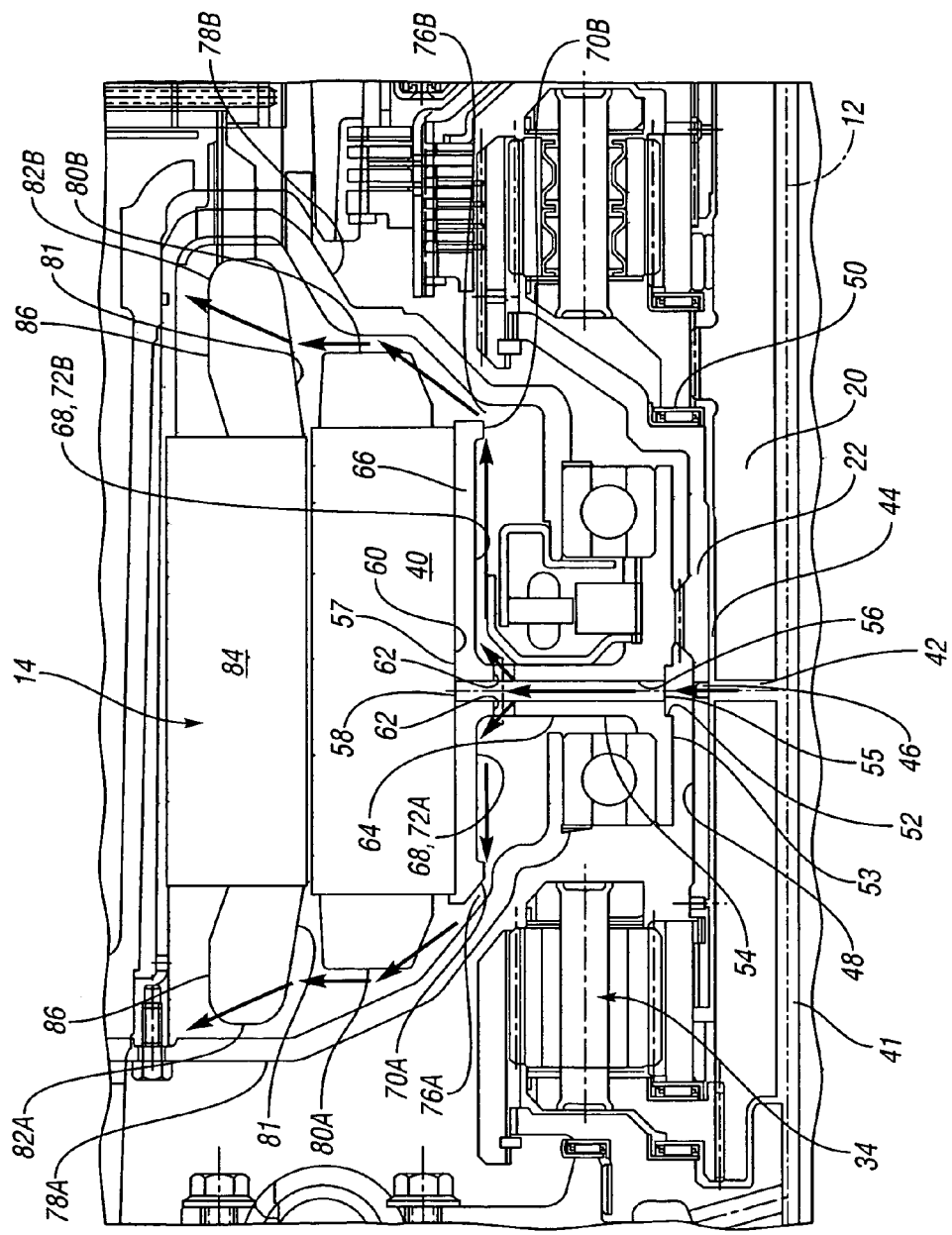
FIG. 2 is a schematic cross-sectional illustration in fragmentary view of the motor/generator of FIG. 1 illustrating the flow path of cooling fluid.

Referring to FIG. 2, a unique motor/generator cooling arrangement is presented. Only first motor/generator module 14 is shown; second motor/generator module 16 has like structure and is cooled in an identical manner. Cooling oil flow (indicated by arrows) to rotor 40 of the first motor/generator module 14 is provided via the gear bearing and clutch lubrication system. Fluid is passed from a conduit 41 in the main shaft 20 through a first orifice 42 in the main shaft 20, through a pressurized clearance or first cavity 44 and a second orifice 46 formed in the inner shaft 22 to a second cavity 48 between rotating components. The second orifice 46 restricts flow into the second cavity 48. Flow rate through the second orifice 46 is determined from flow equations based upon orifice diameter and fluid pressure, as will be well understood by those skilled in the art. Precise control of this flow rate allows for optimization of rotor cooling versus system efficiency (i.e., cooling requirements versus energy expended to deliver the cooling fluid).

The first cavity 44 is formed between the concentric main shaft 20 and inner shaft 22. The pressurized fluid in the conduit 41 and cavities 44, 48 is provided from a fluid source such as a sump (not shown) by a pump (not shown), as is known in the art. Notably, the fluid used to cool the rotor 40 is also used to cool transmission gearing such as planetary gear set 34 and thrust bearing 50, as is evident from FIG. 2, the first and second cavities 44, 48 also being in fluid communication with these components.

The fluid flowing through the second orifice 46 into the second cavity 48 is caught in an annulus 52 formed at the inner diameter 53 of the motor/generator rotor hub 54. The fluid is then centrifugally directed into radial passages 56 (one shown) preferably drilled from the outside diameter 57 of the rotor hub 54. The annulus 52 is at an inner end 55 of radial passage 56. An outer end 58 of the radial passage 56 is sealed by an inner diameter 60 of the rotor 40 when the rotor 40 is placed on the hub 54. Axial passages 62 are drilled parallel to and intersect with the radial passage 56. The radial passages 56 are formed in a radial support portion 64 of the rotor hub 54. A flange-like, generally axial shoulder portion 66 extends from the radial support portion 64.

Cooling fluid passes from the radial passage 56, through the axial passages 62 and is directed along the inside diameter 68 of the shoulder portion 66. The ends 70A, 70B of the shoulder portion 66 extend radially inward to form shoulder portion annuli 72A, 72B between the radial support portion 64 and the respective ends 70A, 70B. The ends 70A, 70B catch fluid exiting the axial passages 62 to pool it in the annuli 72A, 72B, providing a layer of fluid at the inner diameter 68 of the shoulder portion 66 to remove heat from the inner diameter 60 of the rotor 40. By providing an even fluid distribution about the inner diameter 68 of the shoulder portion 66, cooling of the rotor inner diameter 60 is more uniform.

Fluid spills over the ends 70A, 70B and is centrifugally directed through crevices 76A, 76B formed between the shoulder portion 66 or the rotor hub 54 and a two-piece motor housing 78A, 78B, respectively. Fluid exiting the crevices 76A, 76B is centrifugally thrown radially outward onto ends 80A, 80B of the rotor 40, removing additional heat from the rotor 40. Finally, the fluid is thrown radially outward from the rotor ends 80A, 80B, toward an inner diameter 81 of motor/generator stator windings 82A, 82B of stator 84 to assist in cooling the inner diameter side of the looped stator windings 82A, 82B. (The stator 84 is preferably interference fit with a portion of the motor housing 78B to surround the rotor 40.) Typically, high density stator windings make it difficult for fluid introduced at the side of the stator windings near an outer diameter 86 of the looped windings to reach an inner diameter 81 of the stator windings (i.e., it is difficult for fluid to travel radially inward through the windings). Thus, by cooling the inner diameter side of the windings, a reduction in cooling of the stator outer diameter 86 and resulting improvement in system efficiently may be achieved. After cooling the stator windings 82A, 82B, the fluid is drained to a sump and cooled through a radiator, as is known in the art, before returning to the conduit passage 41 to begin the cooling process again.

Accordingly, cooling fluid is routed to the most important locations for removing heat from the stator and rotor (i.e., inner diameter of the rotor, rotor ends and inner diameter side of the stator windings); because fluid is provided directly to these areas, inefficiencies associated with other cooling methods, such as spin losses inherent in spray cooling and splash cooling, are avoided. Also, additional structure, such as diverters required to direct fluid onto components in splash cooling arrangements, may not be necessary.

As described above with respect to the structure of FIG. 1 and 2, the invention provides a method of cooling an electromechanical transmission 10 which includes supporting a rotor 40 on a rotor hub 54 and forming at least one passage 56, 62 in the rotor hub 54 to allow cooling fluid flow through the passage for cooling of the rotor. Next, cooling fluid is directed through the passages for cooling of the rotor. A cavity (second cavity 48) may be formed in fluid communication with the passages 56, 62 and fluid flow restricted from the cavity to the passage (e.g., via a second orifice 46) under the method. The method may include catching fluid provided from the orifice 46 in an annulus 52 formed by the rotor hub 54 at the inner end 55 of the passage 56. Preferably, a lubrication-requiring component (first planetary gear set 34 and thrust bearing 50) is provided and fluid from the cavity 44 is also used to cool that component such that the motor cooling is combined with other cooling systems in the transmission. Pooling fluid in the shoulder portion annuli 72A, 72B described above, throwing cooling fluid from the annuli 72A, 72B, through the crevices 76A, 76B between the motor housing 78A, 78B and the rotor hub 54, onto rotor ends 80A, 80B and then onto the stator windings 82A, 82B at an inner diameter 81 thereof may also be included in the method.

While the best mode for carrying out the invention has been described in detail, those familiar with the art to which this invention relates will recognize various alternative designs and embodiments for practicing the invention within the scope of the appended claims.

The invention claimed is:

1. An electric motor/generator having a generally annular stator and rotor, comprising:

a rotor hub supporting the rotor, wherein said rotor hub has at least one passage formed therein to permit cooling fluid flow therethrough for cooling of the rotor; and a motor housing containing the rotor, the stator and said rotor hub;

wherein said at least one passage has a radially inner end;

wherein said rotor hub is formed with a recessed annulus at a radially inner diameter thereof and at said inner end of said at least one passage; and wherein said annulus is configured to collect cooling fluid for subsequent flow radially outward through said at least one passage;

wherein said rotor hub includes a generally radial support portion and a shoulder portion extending generally-axially therefrom;

wherein an end of said shoulder portion protrudes radially inward such that said shoulder portion forms a shoulder portion annulus between said radial support portion and said end;

wherein cooling fluid flowing from said at least one passage is caught by said end and pools in said shoulder portion annulus to cool the rotor;

wherein the rotor has an end bar;

wherein said motor housing is spaced from said rotor hub to form a crevice therebetween; and wherein fluid pooled in said shoulder portion annulus spills past said end and flows through said crevice and onto the end bar of the rotor for cooling thereof.

2. The electric motor/generator of claim 1, wherein said at least one passage includes a generally radial passage and a generally axial passage, said radial passage intersecting said axial passage to permit cooling fluid to exit said radial passage via said axial passage.

3. The electric motor/generator of claim 1, wherein said rotor hub has an outer diameter;

wherein said at least one passage has an outer end at said outer diameter; and wherein the rotor is supported by said rotor hub at said outer diameter, the rotor thereby sealing said outer end to block flow therefrom.

4. A hybrid electromechanical transmission comprising:
an electric motor/generator having:
a rotor; wherein said rotor has an end bar;
a rotor hub supporting said rotor and having at least one passage formed therein;
a lubrication-requiring transmission component;
transmission elements forming a cavity;
wherein said cavity is in fluid communication with both said lubrication-requiring transmission component and said at least one passage to provide cooling fluid to said lubrication-requiring transmission component for cooling thereof and to said rotor hub for cooling of said rotor;
a motor housing containing said rotor, said stator and said rotor hub and being spaced from said rotor hub to form a crevice therebetween; and
wherein said at least one passage is in fluid communication with said crevice such that fluid exiting said at least one passage flows through said crevice via centrifugal force and is thrown onto said end bar for cooling thereof.

5. The hybrid electromechanical transmission of claim 4, wherein said transmission elements include co-axial shafts forming said cavity therebetween.

6. The hybrid electromechanical transmission of claim 4, wherein at least one of said transmission elements forms an orifice; and wherein said cavity is in fluid communication with said at least one passage through said orifice to control flow volume to said at least one passage.

7. The hybrid electromechanical transmission of claim 6, wherein said at least one passage has an inner end; and wherein said rotor hub forms an annulus at said inner end positioned to route fluid flowing through said orifice.

8. The hybrid electric motor/generator transmission of claim 4, wherein said stator has windings with an inner diameter and an outer diameter; and wherein fluid is thrown by centrifugal force from said rotor end to said inner diameter of said windings for cooling thereof.

9. The hybrid electromechanical transmission of claim 4, wherein said rotor hub has a radial support portion and a shoulder portion extending generally axially from said radial support portion; and wherein said shoulder portion has an end protruding radially inward such that said shoulder portion forms a shoulder portion annulus between said end and said radial support portion; said shoulder portion annulus being in fluid communication with said at least one passage to pool fluid flowing from said at least one passage in said annulus to cool said rotor.

* * * * *